United States Patent [19]
Burnham

[11] 3,847,406
[45] Nov. 12, 1974

[54] FOLDING STROLLER
[75] Inventor: Benjamin K. Burnham, Gardner, Mass.
[73] Assignee: Thayer, Inc., Gardner, Mass.
[22] Filed: Mar. 27, 1973
[21] Appl. No.: 345,329

[52] U.S. Cl. .............................. 280/36 B, 297/45
[51] Int. Cl. ........................................... B62b 11/00
[58] Field of Search ........ 280/36 B, 41 A, 41 B, 38; 297/45

[56] References Cited
UNITED STATES PATENTS

| | | | |
|---|---|---|---|
| 2,607,605 | 8/1952 | Lines | 280/41 B |
| 3,059,963 | 10/1962 | Hamilton | 280/36 B |
| 3,421,774 | 1/1969 | Patterson | 280/41 A |
| 3,443,823 | 5/1969 | Perego | 280/36 B |

FOREIGN PATENTS OR APPLICATIONS

| | | | |
|---|---|---|---|
| 626,653 | 8/1961 | Canada | 280/36 B |
| 770,115 | 3/1957 | Great Britain | 280/36 B |

Primary Examiner—Robert R. Song
Attorney, Agent, or Firm—Charles R. Fay

[57] ABSTRACT

A lightweight folding stroller which is easily folded and erected by a single hand or arm operation. A pusher handle frame is pivoted at one end to a rear wheel frame, and a front wheel frame is also pivoted to the pusher handle frame slightly inwardly of the point of connection of the rear frame to the handle frame. A seat is pivoted both to the rear frame and the front frame, and latching means is provided to hold the stroller erected, said latching means comprising rings which are easily moved to a position to allow the stroller to fold with a single one-hand operation.

11 Claims, 5 Drawing Figures

FOLDING STROLLER

BACKGROUND OF THE INVENTION

Reference is made to my copending application on FOLDING STROLLER, Ser. No. 296,061, filed Oct. 10, 1972. That application discloses a lightweight folding stroller that is easily folded and erected by a single hand or arm operation, and the construction shown therein provides a very efficient, sturdy, and easily operated stroller.

However, the inventor has found that the same results can be obtained by a more simple construction in which certain of the parts of the structure of the above identified application are omitted as well as of course the time which is required in assembling such parts, so that a less expensive version of the folding stroller of the pending application is presented herewith.

SUMMARY OF THE INVENTION

The folding stroller of the present invention comprises a front frame and a rear frame both of which are preferably U-shaped and each having a pair of a spaced wheels thereon at the closed ends of the Us. The front frame is longer than the rear frame and the two frames are interpivotally associated but not directly connected at the free end portions of the frames. A seat frame is pivoted directly to both frames at points intermediate the ends of the front and rear frames.

A U-shaped pusher handle frame is provided, this frame being inverted, and is pivotally connected to the rear and front frames at the free ends of the frames.

The end portions of the shorter rear frame are pivoted to the end portions of the U-shaped pusher handle frame and the end portions of the U-shaped front frame are interpivoted with respect to the legs of the U-shaped handle frame inwardly with respect to the pivot point of the rear frame and the handle frame. The seat frame is provided with a flexible fabric foldable seat and backrest member similar to that disclosed in my copending application and also captive rings are utilized to lock the three frames together when the stroller is erected. The interpivoting of the rear frame to the handle frame, and of the front frame to the handle frame, provides a past dead center connection which cannot be broken as long as the rings are in locking position, the rings being merely lifted slightly to allow the handle to be utilized to completely fold the stroller so that the three frames are in close overlapping condition with the handle frame and the rear frame encompassing the front frame and the seat frame which lie between them in the folded condition of the stroller.

BRIEF DESCRIPTION OF THE DRAWINGS

FIG. 4 is a detail view in elevation looking in the direction of arrow 4 in FIG. 1; and FIG. 5 is a view showing the stroller folded.

PREFERRED EMBODIMENT OF THE INVENTION

Figure 1:
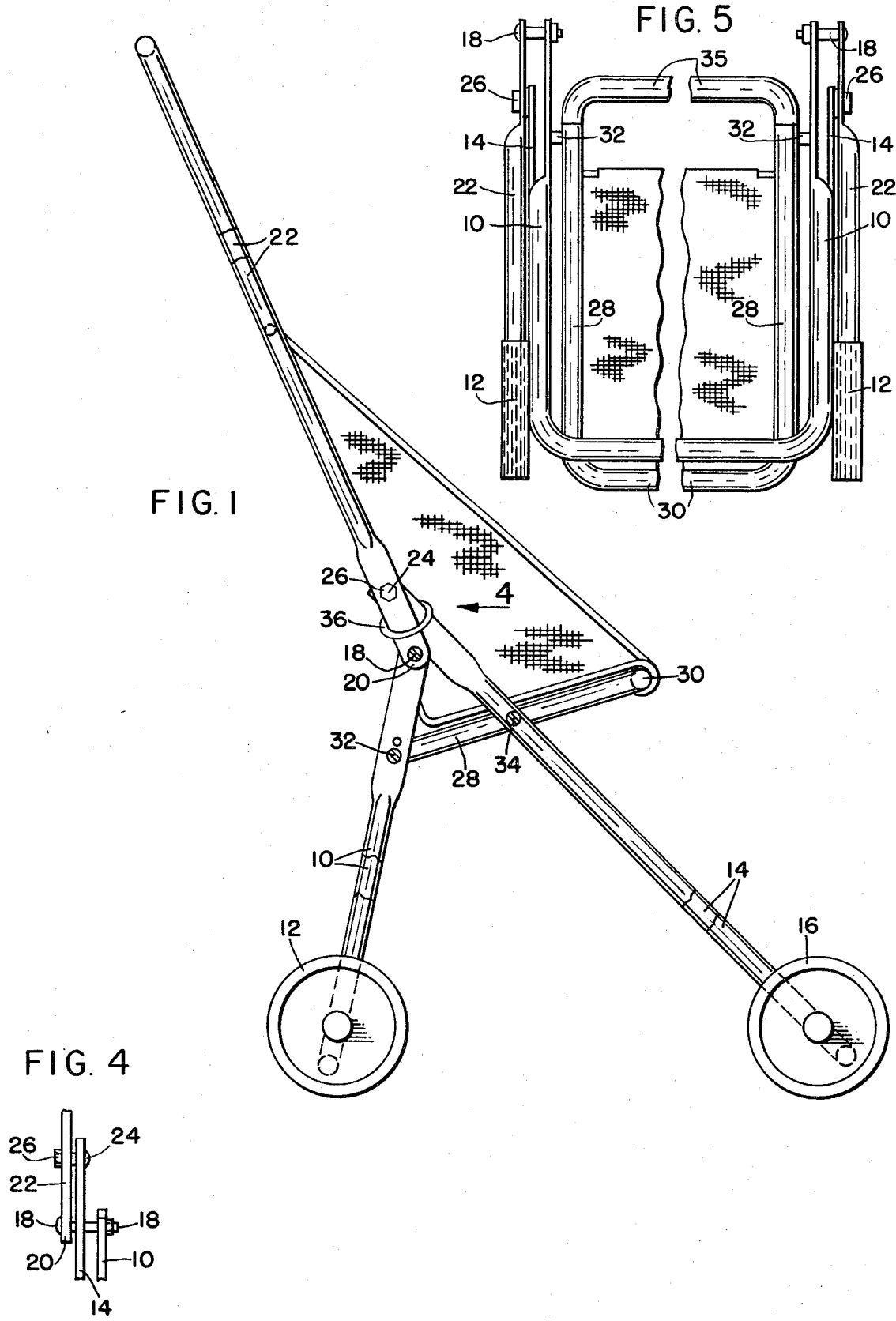
FIG. 1 is a view in side elevation showing the stroller erect and latched.

A rear U-shaped frame 10, 10 has spaced legs open and free at their upper ends and connected and closed at the lower end of this frame. These legs mount wheels 12 adjacent the lower ends thereof. There is a similar but longer U-shaped front frame 14 including similar legs and sheels 16. The upper ends of the legs of the front frame are also free and open, and are connected at the lower end thereof.

The extreme upper ends of the legs of the rear frame 10 are pivoted as at 18 to the lower free ends 20 of a pusher handle frame 22 which is also of U-shape but inverted. The upper ends of the front frame legs 14 are pivoted as at 24 with respect to the lower end portions of the U-shaped handle frame but inwardly at an appreciable distance from the pivot 18. The pivot at 24 provides outstanding pins 26 as illustrated in FIG. 4. The pivot 18 underlies the upper end portions of the legs of the front frame. This pivot is free of the front frame.

A U-shaped seat frame 28 has a closed front end as at 30 and an opposite open end pivoted as at 32 with respect to the legs of the rear frame 10 of the stroller. The seat frame is pivoted intermediate its ends to the front frame as at 34. A tube or rod 35 may close the open end of the seat frame, and this tube or rod is free and clear of the seat itself, see FIG. 5, so that it is available as a handle when the stroller is folded.

As seen in FIG. 1, there is a loose ring locking means 36 shown in a position where the pivot 18 is past dead center with respect to the pusher handle frame and the rear frame. The locking ring encompasses the upper end portion of the front frame legs and does not have and effect on the rear frame directly. However the lower end portion of the pusher handle frame is also encompassed by ring 36 which prevents any forward or any counterclockwise motion of pusher handle 22 in FIG. 1, and therefore the linkage described holds all the parts firmly erect as shown in FIG. 1.

Figure 2:
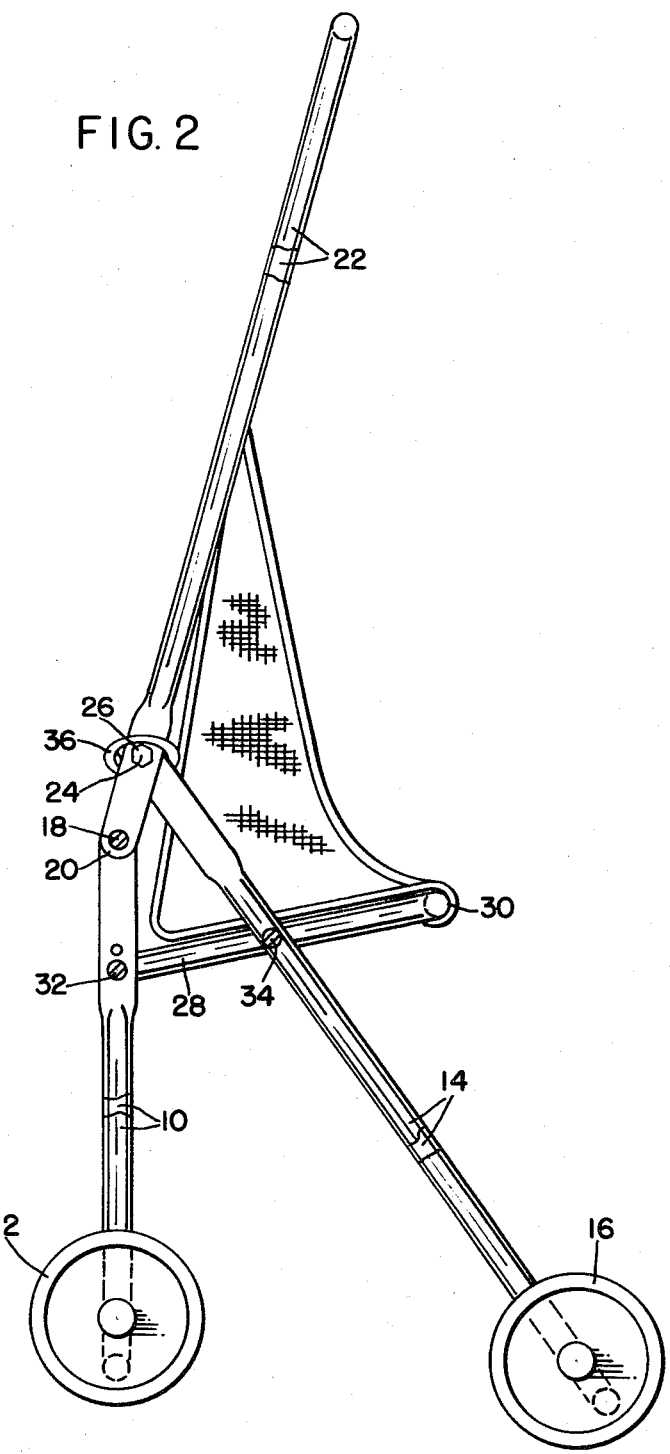
FIG. 2 is a similar view showing the stroller unlatched and the start of the folding operation thereof.
Figure 3:
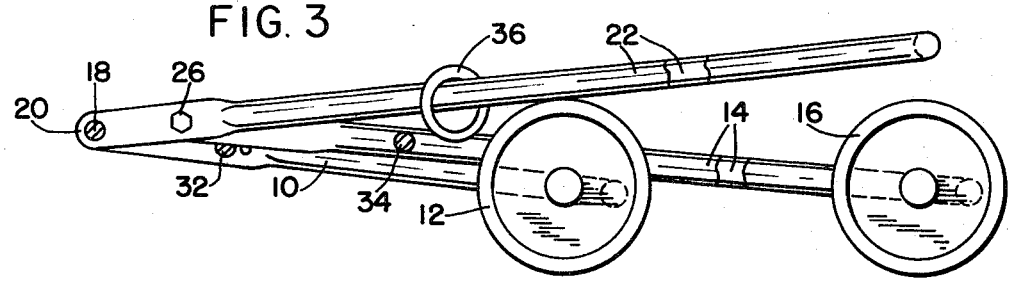
FIG. 3 is a view in side elevation showing the stroller folded.

If it is desired to fold the stroller, then the locking ring 36 must be moved slightly upwardly and hung onto pin 26, and in this condition the legs of the front frame are fee of restrictive action and the pusher handle frame at 22, 22 may be moved in a clockwise direction. In this case, the rear frame 10, 10 is moved in the opposite direction and the seat frame 28 starts to fold also in an anticlockwise direction, see FIG. 2. Continued motion of the handle frame brings the parts into the folded condition shown in FIG. 3.

It will be seen that several parts of the folding stroller of the above identified application have been omitted but that the general objects of the invention are obtained, i.e., the folding stroller may be folded and erected by a single hand motion, but when erected is securely locked by the locking means 36.

I claim:

1. A folding stroller comprising a front frame, a rear frame, a pusher handle frame, and a seat frame, and wheels on the front and rear frames at corresponding ends thereof, first means for pivotally connecting the end of the front frame opposite the wheels to the pusher handle frame; second means for pivotally connecting the ends of the rear frame opposite the wheels to the pusher handle frame, said second pivot means being spaced from said first pivot means toward said wheels, means pivotally connecting said seat frame to said rear frame and front frame intermediate the ends of respectively said rear and front frame, and releasable locking means locking the front frame with respect to the pusher handle frame in erected position of the stroller.

2. The stroller of claim 1 wherein the frame and U-shaped.

3. The stroller of claim 2 wherein the means interpivoting the frames are located adjacent the open ends of the U-shaped frames.

4. The stroller of claim 1 wherein the releasable locking means comprises a loose ring on the front frame and the pusher handle frame.

5. The stroller of claim 1 wherein the locking means comprises a loose ring embracing the adjacent ends of the pusher handle frame and the front frame between the pivots of the front and rear frames respectively to the pusher handle frame.

6. The stroller of claim 5 including means to support the ring in free condition thereof with respect to the pusher handle frame and the front frame to allow folding of the stroller.

7. A folding stroller comprising a U-shaped front frame, a U-shaped rear frame, a U-shaped pusher handle frame, a seat frame, wheels on both of said frames adjacent the closed ends of the respective Us, the front frame being longer than the rear frame, first means for pivotally connecting the end of the front frame opposite the wheels to the pusher handle frame, second means for pivotally connecting the end of the rear frame opposite the wheels to the pusher handle frame, said second pivot means being spaced from said first pivot means toward said wheels, means pivotally connecting said seat frame to said rear frame and front frame intermediate the ends of respectively said rear and front frame, and movable locking means encompassing the upper end portions of the ends of the legs forming the U-shaped front frame and the lower end portions of the ends of the legs forming the U-shaped pusher handle frame, latching the same in erect condition of the stroller.

8. The stroller of claim 7 wherein the locking means comprises a movable ring.

9. The stroller of claim 8 including means for supporting the ring in a position releasing the front frame from the pusher handle frame so that the stroller may be folded.

10. The stroller of claim 7 wherein the adjacent, interpivoted ends of the rear frame and the pusher handle frame form a past dead connection relative to the front frame and the seat frame, and the movable locking means comprises a loose rim embracing the ends of the pusher handle frame and the front frame.

11. The stroller of claim 7 wherein the seat frame includes a cross member serving as a handle with the stroller folded.

* * * * *